United States Patent [19]
Grochowski

[11] Patent Number: 6,088,790
[45] Date of Patent: Jul. 11, 2000

[54] USING A TABLE TO TRACK AND LOCATE THE LATEST COPY OF AN OPERAND

[75] Inventor: Edward T. Grochowski, San Jose, Calif.

[73] Assignee: Intel Corporation, Santa Clara, Calif.

[21] Appl. No.: 08/994,510

[22] Filed: Dec. 19, 1997

[51] Int. Cl.$^7$ ................................................ G06F 9/38
[52] U.S. Cl. ................................ 712/218; 712/217
[58] Field of Search ................................ 712/216, 217, 712/218

[56] References Cited

U.S. PATENT DOCUMENTS

| | | | |
|---|---|---|---|
| 4,903,196 | 2/1990 | Pomerene et al. | 712/217 |
| 5,778,248 | 7/1998 | Leung | 712/23 |
| 5,790,880 | 8/1998 | Ireton | 712/23 |
| 5,898,853 | 4/1999 | Panwar et al. | 712/216 |

*Primary Examiner*—Richard L. Ellis
*Attorney, Agent, or Firm*—Blakely, Sokoloff, Taylor & Zafman LLP

[57] ABSTRACT

The invention, in one embodiment, is a table for tracking operand locations in a processor pipeline. The table includes an entry for each one of a plurality of general purpose registers. Each entry further includes an indication of which port last wrote to the corresponding register; an indication of a pipeline stage containing the instruction that last wrote to the corresponding register; and an indication of whether the operand resides in the pipeline or in a register.

33 Claims, 8 Drawing Sheets

USING A TABLE TO TRACK AND LOCATE THE LATEST COPY OF AN OPERAND

BACKGROUND OF THE INVENTION

1. Field of the Invention

This invention relates generally to processor pipelines and, more particularly, to a table for tracking operand locations through such a pipeline.

2. Description of the Related Art

Computers and many other types of machines are engineered around a "processor." A processor is an integrated circuit that executes programmed instructions on data stored in the machine's memory. There are many types of processors and there are several ways to categorize them. For instance, one may categorize processors by their intended application, such as microprocessors, digital signal processors ("DSPs"), or controllers. One may also categorize processors by the complexity of their instruction sets, such as reduced instruction set computing ("RISC") processors and complex instruction set computing ("CISC") processors. The operational characteristics on which these categorizations are based define a processor and are collectively referred to as the processor's architecture. More particularly, an architecture is a specification defining the interface between the processor's hardware and the processor's software.

One aspect of a processor's architecture is whether it executes instructions sequentially or out of order. Historically, processors executed one instruction at a time in a sequence. A program written in a high level language was compiled into object code consisting of many individual instructions for handling data. The instructions might tell the processor to load or store certain data from memory, to move data from one location to another, or any one of a number of data manipulations. The instructions would be fetched from memory, decoded, and executed in the sequence in which they were stored. This is known as the "sequential programming model." Out of order execution involves executing instructions in some order different from the order in which they are found in the program.

The sequential programming model creates what are known as "data dependencies" and "control dependencies." For instance, if one uses the variable x to calculate a result, one needs to know the value of x and that value might depend on results from previously executed instructions. Similarly, a group of instructions might contain two alternative subsets of instructions, only one of which will be executed, depending on some specified condition. Thus, the result of executing the group of instructions will depend on whether a branch is executed. Even out of order execution follows this sequential programming model, and it therefore also creates data and control dependencies.

A second aspect of a processor's architecture is whether it "pipelines" instructions. The processor fetches instructions from memory and feeds them into one end of the pipeline. The pipeline is made of several "stages," each stage performing some function necessary or desirable to process instructions before passing the instruction to the next stage. For instance, one stage might fetch an instruction, the next stage might decode the fetched instruction, and the next stage might execute the decoded instruction. Each stage of the pipeline typically moves the instruction closer to completion.

Some advanced processor pipelines process selected instructions "speculatively." Exemplary speculative execution techniques include, but are not limited to, advanced loads, branch prediction, and predicate prediction. Speculative execution means that instructions are fetched and executed before resolving pertinent control dependencies. Speculative execution requires a prediction as to what instructions are needed depending on whether a branch is taken, executing fetched instructions, and then verifying the execution and prediction. The pipeline executes a series of instructions and, in the course of doing so, makes certain predictions about how control dependencies will be resolved. For instance, if two instructions are to be alternatively executed depending on the value of some quantity, then the pipeline has to guess what that value will be or which instruction will be executed. The pipeline then predicts the next instruction to be executed and fetches the predicted instruction before the previous instruction is actually executed.

A pipeline therefore has the tremendous advantage that, while one part of the pipeline is working on a first instruction, a second part of the pipeline can be working on a second instruction. Thus, more than one instruction can be processed at a time, thereby increasing the rate at which instructions can be executed in a given time period. This, in turn, increases the processor throughput.

A third aspect of a processor's architecture is whether the processor is "superscalar." Historically, processors executed only one instruction at a time, i.e., in any given clock cycle. Such a processor is called a "scalar" processor. More recently, "superscalar" processors have been designed that execute more than one instruction at a time. More technically, a scalar processor executes one instruction per clock cycle whereas a superscalar processor executes more than one instruction per clock cycle.

Superscalar processors typically use a pipeline as described above where different stages of a pipeline work on different instructions at any given time. Not only do superscalar processors work on several different instructions at a time, but each stage of a superscalar pipeline processes more than one instruction each clock cycle. A superscalar pipeline usually includes one or more stages having several execution units executing instructions in parallel. Each execution unit reads from and writes to storage through "functional unit ports." Thus, a pipeline including N execution units may be described as an N-way pipeline having N functional unit processors.

One of the pipeline's most significant challenges in speculative execution is verification. At the end of the pipeline, the results from executed instructions are temporarily stored in a buffer until all their data and control dependencies have been actually resolved. The pipeline then checks to see whether any problems occurred. If there are no problems, then the executed instructions are "retired." This is sometimes referred to as "commitment to an architectural state" or "retirement to a committed state." Retirement, or commitment, signals that all dependencies have been correctly resolved and that the execution results are finalized.

However, no pipeline correctly predicts all eventualities and, when problems occur, they must be repaired. Problems can typically be traced to executing an instruction that should not have been executed; omitting an instruction that should have been executed; or executing an instruction with incorrect data. The effects of such problems on subsequent execution of instructions must also be repaired. Repairing the effects of such a problem in a superscalar pipeline is a particular concern because the effects might propagate other problems in instructions currently being processed. Once the problem and its effects have been repaired, the pipeline can then process the execution stream correctly.

Most pipelined processors "stall" the pipeline upon detecting a problem. As discussed above, the pipeline is usually divided into several stages. Progress through the stages is governed by a number of latches enabled by a signal generated by a particular part of the pipeline. If a problem is detected, the latches are disabled and the pipeline "stalls" such that the instructions can no longer be transferred into the next stage. The problem and its effects are then repaired, the latches are re-enabled, and the pipeline resumes.

Some processor pipelines "replay" in addition to stalling. Replay is the re-execution of instructions upon detecting an execution problem in the retirement of speculative results. The speculative results are not retired, i.e., used to update the architectural state of the processor, but are instead ignored. The pipeline corrects the problem and then re-executes the instructions. The new results are then checked for problems and retired.

One such processor is the Alpha 21164 microprocessor, commercially available from Digital Equipment Corporation. The Alpha 21164 stalls only the first three stages of the pipeline. If a problem occurs after the third stage, the Alpha 21164 replays the entire pipeline beginning with the repaired problem instead of stalling the problem in midstream. However, replaying the entire pipeline regardless of the problem can be expensive in terms of time. The Alpha 21164 therefore combines expensive stalling with complex decision-making circuitry necessary to determine when to replay. Also, when the Alpha 21164 replays, it replays the entire pipeline line even though the problem may be localized at some point in the pipeline.

A fourth aspect of computer architecture is storage utilization. Virtually all processors employ a type of memory known as a "register." A register is a high speed storage element used to temporarily store information. When the information necessary to execute an instruction is stored in a register, or several registers, the instruction can be executed more rapidly than if the information were stored in other kinds of storage.

Many processors not only have a number of registers, but include several types of registers for special purposes. As with processors, registers may be typed according to a number of distinct criteria derived from the functions they perform. Different types of registers serve different logic and architectural purposes in a processor. For instance a general purpose register is for general purpose storage for calculations as well as moving data in and out of the processor. Other types of registers found in some processors are speculative and architectural registers discussed more below.

Registers hold "operand values" during execution. An operand is a part of an instruction specifying a storage location, such as a register, that provides data to or receives data from the results of executing an instruction. An operand value is the data provided to or received by the storage location specified by the operand. Consider the following instruction:

Add R10=R11, R12

This instruction tells the processor to add the operand value stored in the register $R_{11}$ to the operand value stored in register $R_{12}$ and to store the resulting sum, also an operand value, in register $R_{10}$. In the sample instruction, R10, R11, and R12 are all operands because they specify a storage location for an operand value used in executing the instruction.

Operands may also be referred to as "source operands" and "destination operands." A source operand provides an operand value necessary to execute an instruction. A destination operand stores an operand value resulting from executing an instruction. In the sample instruction above, R10 is a destination operand because it specifies the storage location for the results of executing the instruction. Similarly, R11 and R12 are source operands because they provide operand values necessary for executing the instruction.

A register may hold an operand value that has not been retired or committed to an architectural state. Uncommitted operand values are referred to as "speculative" and a register holding uncommitted operand value is referred to as a "speculative register." If an operand value has been committed, it is referred to as a "committed," "retired," or "architectural" operand value and the register is a "committed," "retired," or "architectural register."

Some processor pipelines may speculatively execute selected instructions as discussed above. This is particularly true of superscalar processors. Speculative, out of order execution sometimes requires a speculative "operand value." A speculative operand value may be stored in a speculative register. A speculative operand value may also be in some stage of the pipeline for processing another instruction. Consider the following instructions:

Add R10=R11, R12

Add R20=R10, R21

The operand value stored in the operand $R_{10}$ as a result of executing the first instruction is speculative when used in the second instruction because will not be retired at that time.

Such a pipeline therefore typically includes a "bypass" stage. The bypass stage forwards the source operand to another point in the pipeline to obtain the speculative operand value for use in subsequent execution. Using the sample instructions immediately above, the source operand $R_{10}$ is bypassed from the stage executing the first instruction to the stage executing the second instruction, to obtain the operand value therefrom. It is important that the operand be bypassed to the latest copy of the operand in order to minimize, or at least lessen, the occurrence of problems in execution. In order to "bypass" operand values, the pipeline must consequently be able to determine where speculative operands are in the pipeline.

Pipelines typically track operands using large arrays of comparators. For instance, the Pentium® microprocessor manufactured and sold by Intel Corporation of Santa Clara, Calif. uses a large number of comparators to implement a "reservation station" that tracks operands in the pipeline thereof. However, as pipelines get wider and deeper in terms of ALUs and pipeline stages, respectively, operand value tracking with comparators becomes problematic. Larger networks of comparators require larger proportions of the processor die, which is undesirable. Larger networks also eventually become slower, thereby reducing performance in terms of frequency. Future generations of processors are generally expected to be both much deeper and much wider than current processors. Thus, operand value tracking using comparators is quickly becoming impracticable.

The present invention is directed to overcoming, or at least reducing the effects of, one or more of the problems set forth above.

SUMMARY OF THE INVENTION

The invention, in one embodiment, is a table for tracking operand locations in a processor pipeline. The table includes an entry for each one of a plurality of general purpose registers. Each entry further includes an indication of which port last wrote to the corresponding register; an indication of a pipeline stage containing the instruction that last wrote to the corresponding register; and an indication of whether the operand resides in the pipeline or in a register.

BRIEF DESCRIPTION OF THE DRAWINGS

Other objects and advantages of the invention will become apparent upon reading the following detailed description and upon reference to the drawings in which.

Figure 1:
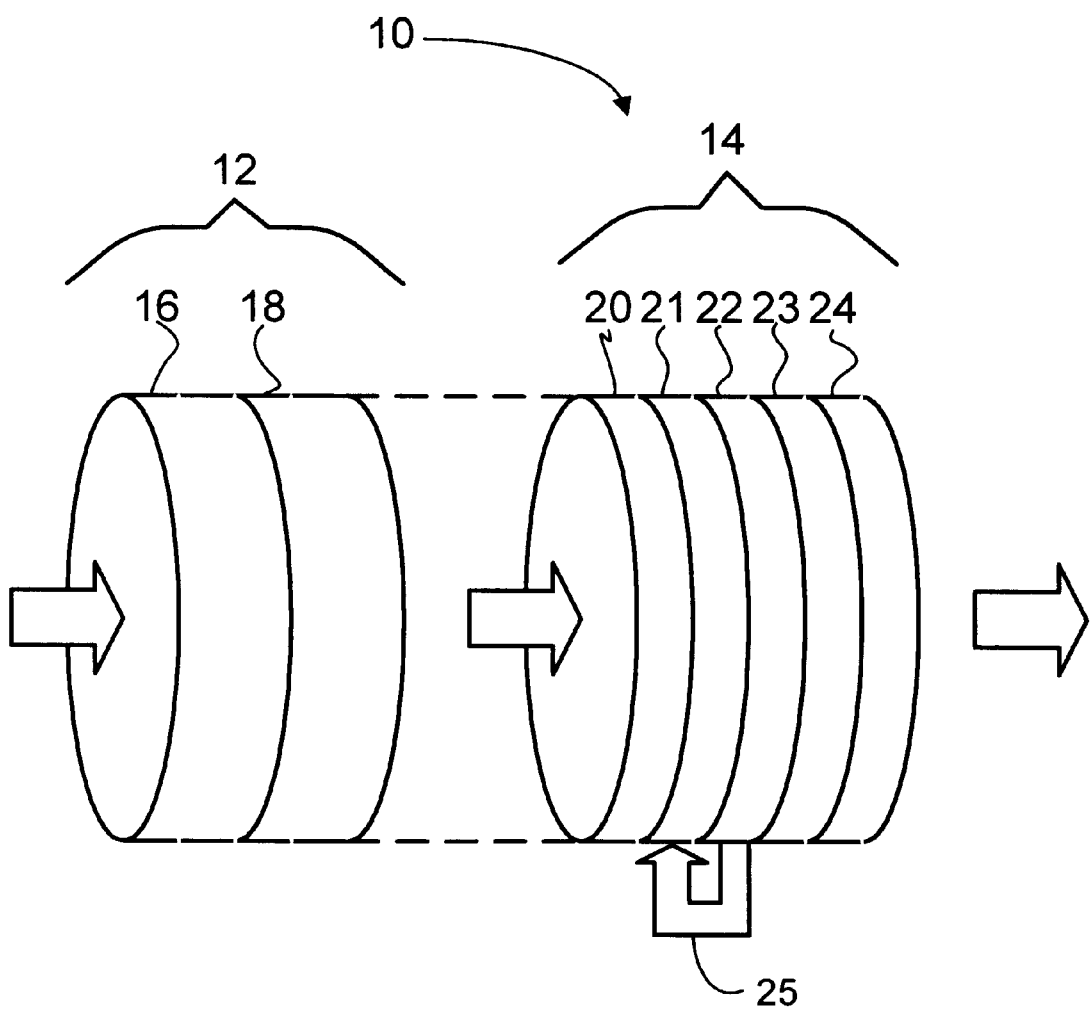
FIG. 1 is a partially exploded view of a conceptualized superscalar processor pipeline in which the present invention may be implemented in a first embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates in a partially exploded view a first embodiment 10 for a processor pipeline in which the present invention may be implemented. The pipeline 10 includes a front end 12 and a back end 14. The front end 12 fetches instructions and, in this particular embodiment, prepares "micro-ops" generated therefrom for execution. A micro-op is generally a single transaction that may be executed by a single execution unit (not shown) of the processor in a single clock cycle. An instruction is typically a single micro-op. However, in some embodiments, some more complicated instructions might comprise three or more micro-ops. Thus, there is not necessarily a one-to-one correspondence between instructions and micro-ops. The back end 14 executes the instructions as prepared by the front end 12.

The front end 12 and the back end 14 generally include one or more "stages" of processing. The front end 12 may be of any suitable design known to the art. "Suitable" in this context means that the particular front end 12 fetches instructions from memory and decodes them for execution by the back end 14. In one embodiment, as mentioned above, decode includes expanding the instruction into micro-ops. Other features may be desirable in various alternative embodiments depending on the particular implementation. However, a front end 12 will generally include at least a fetch stage 16 and an expand stage 18.

The back end 14 of the embodiment illustrated in FIG. 1 also includes several stages of processing. The back end 14 generally includes, among others, an operand locate stage 21, a bypass stage 22, an execution stage 23, and a retirement stage 24. The back end 14 reads decoded instructions, reads operands from a register file or bypasses the operand, executes the micro-ops, and retires executed instructions. Execution problems are checked for and detected in the retirement stage.

The back end 14 contains a set of registers (not shown), as is common in superscalar processor pipelines. In the particular embodiment of FIG. 1, they might reside in the execution stage 23. The registers are organized into and accessed through what is known as the "register file" (also not shown). The use of a register file in this manner is commonly known in the art. The register file includes read and write ports through which the execution units read from and write to the registers.

The back end 14 contains a number of execution units (not shown) in the execution stage 23 thereof, also as is common in superscalar processor pipelines. In one particular embodiment, the execution stage 23 includes a plurality of arithmetic logic units ("ALUs"). The execution units write to and read from various registers (not shown) through various "functional unit ports" as is well known in the art.

The stages 16–24 of the pipeline 10 above are merely representative and are neither exclusive nor exhaustive of stages that might be present in various alternative embodiments. Further, as those in the art will appreciate, the demarcation of stages and functions in a processor pipeline are not so crisp or distinct as might appear in FIG. 1. The pipeline 10 in FIG. 1 is conceptualized for the sake of clarity in explaining the present invention. Thus, the precise structure of the front end 12 and the back end 14 in terms of stages is not material to the practice of the invention.

Figure 2:
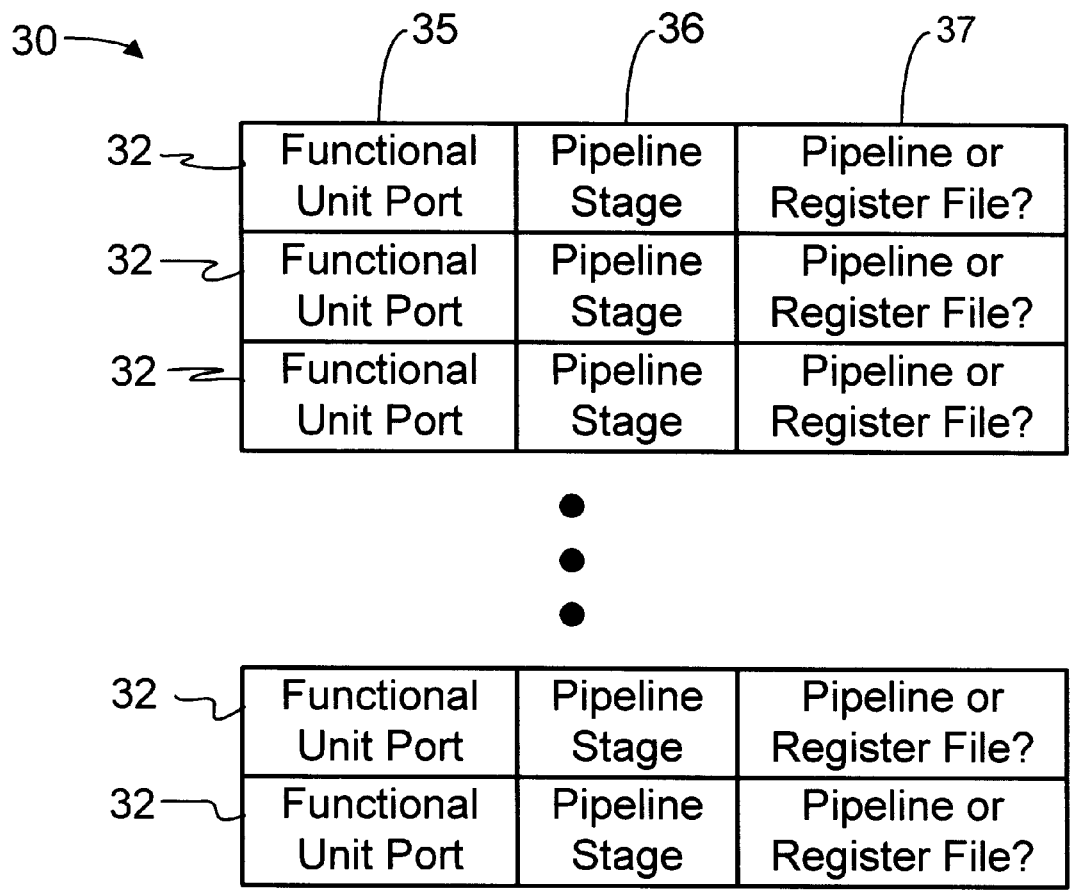
FIG. 2 depicts a table in accordance with one embodiment of the present invention.

FIG. 2 illustrates one particular embodiment of a table 30. As instructions are executed in the pipeline 10, operands may be copied to and from the registers to execute micro-ops generated from pipelined instructions. Operands may also be copied to and from functional unit ports of the execution units as discussed above. To replay the pipeline 10 and more efficiently operate the pipeline 10, the location of the operands should be readily discernible. The table 30 tracks operands in a processor pipeline such as the pipeline 10 of FIG. 1.

The table 30 in the embodiment illustrated comprises one entry 32 for each one of a plurality of general purpose registers $R_0$–$R_N$ (not shown). The table 30 in this particular embodiment is accessed in the same manner as a register file. Thus, the table 30 is accessed in such a manner that the index maps to a particular one of the entries 32. For instance, the first entry may correspond to $R_0$, the second entry to $R_1$, and so on. The index into the table 30 will then direct access for $R_0$ to the first entry, to $R_1$, to the second entry, and so on.

Each entry 32 includes three parts 35–37. The first part 35 is an indication of which functional unit port last wrote to the corresponding register. The second part 36 is an indication of which pipeline stage contains the instruction that last wrote to the corresponding register. The third part 37 is an indication of whether the operand written to the corresponding register resides in the pipeline 10 or a register. Thus, the third part 37 indicates whether the operand should be copied from some point in the pipeline 10 or from a register. The three parts 35–37 are neither exclusive nor exhaustive and various alternative embodiments might include other information.

Figure 3:
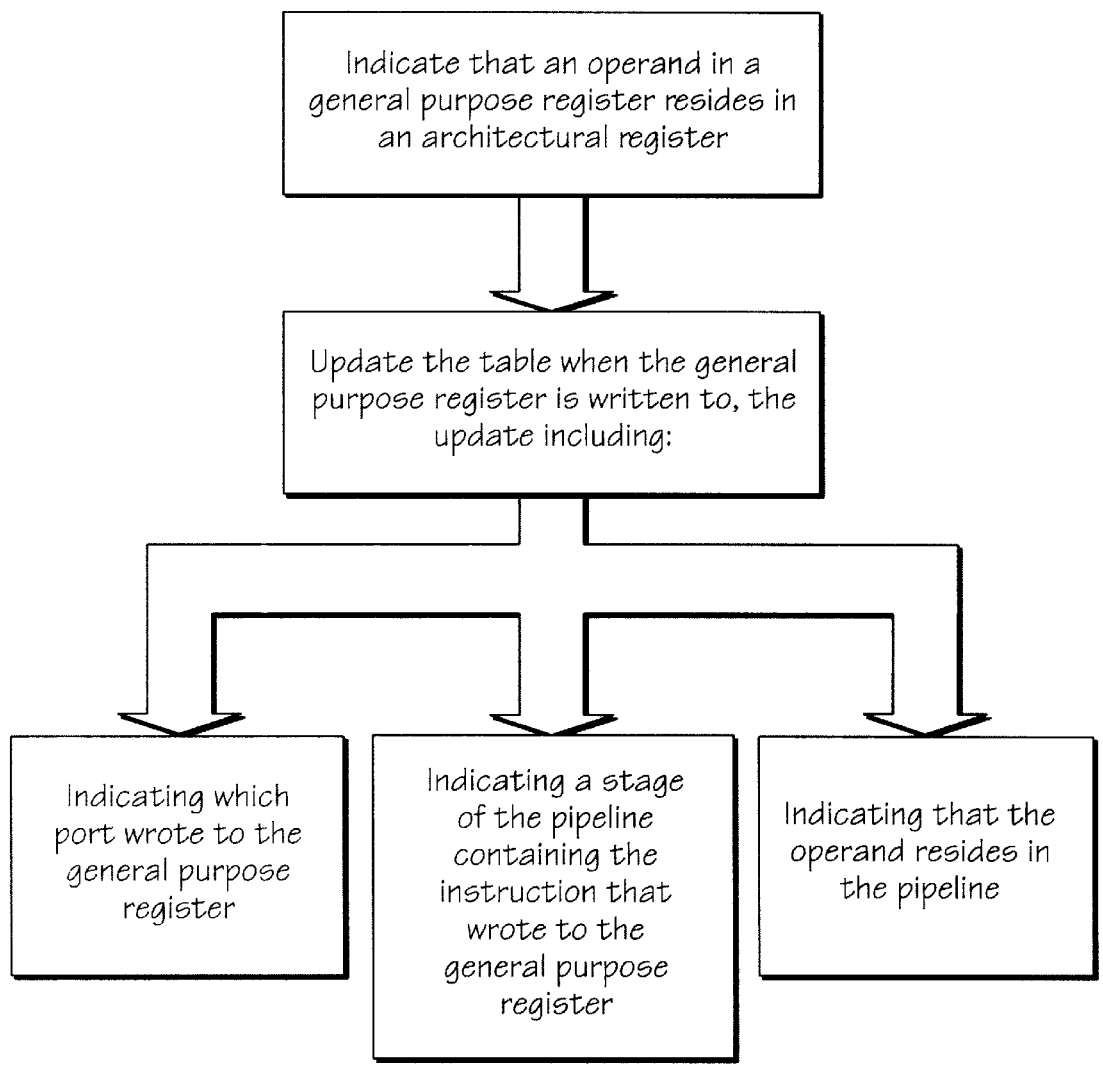
FIG. 3 illustrates the state machine for the table of FIG. 2.

The table 30 in one particular embodiment is constructed from an array of self-updating, finite state machines. FIG. 3 is a state machine diagram for the self-updating state machines. This particular embodiment of the table 30 is employed in a particular embodiment of the pipeline 10 in which the pipeline 10 does not stall, but is rather replayed in a manner discussed more fully below in connection with FIGS. 5–7. This particular embodiment of the pipeline 10 includes X number of stages $S_A$–$S_X$ and N number of execution units $ALU_0$–$ALU_N$. Because the pipeline 10 in this particular embodiment does not stall, an operand's progression through the pipeline is predictable. An operand will move from one stage to the next at every clock cycle provided there are no writes or replays. Thus, each entry 32 of the table 30 updates the first part 35 and the second part 36 at each clock cycle to reflect that progression. Replays and writes, however, interrupt the predictable progression and reset the third entry 37 to indicate that the operand resides in the register rather than the pipeline 10.

More particularly, and with reference to FIGS. 2 and 3, the table 30 is initialized by setting the third part 37 of each entry 32 to indicate that the corresponding operand should be read from the register file. All operands are read from the registers until an operand is written to by an execution unit $ALU_0$–$ALU_N$ indicated by the state 34 in FIG. 3. Once written to, the first and second parts 35 and 36 of the table 30 are updated to indicate the functional unit port and the stage from which the write originated, as indicated by the states 38 in FIG. 3. Operands not yet written to are still read from the register file, as indicated by the state 34 of FIG. 3, as the third parts 37 of the corresponding entry 32 have not yet been updated.

The table entries 32 are automatically updated and sequentially progress through the states 38 of FIG. 3 each time the clock advances as long as there are not further writes to the operand and no replay. A replay or a subsequent write resets the table entry 32 to reflect the original state 38 as the operand re-enters the pipeline. When the operand moves beyond the last state 38, it is retired. The particular entry 32 then returns to the state 34 as the third part 37 is updated to reflect that the operand should be read from the register once again.

The table 30 thereby tracks the location of each operand as it progresses down the pipeline 10 to retirement. As micro-ops enter the back end 14, they are scheduled for execution by particular execution units. A micro-op typically requires an execution unit to manipulate one or more operands. The execution unit then must find the specified operand(s). The execution unit accesses the particular entry of the register indicated by the operand in the table 30. The execution unit then determines from the third part 37 whether the operand is stored in a register or is in the pipeline 10. If it is in a register, the execution unit retrieves a copy of the operand from the register through the register file. If it is in the pipeline 10, the execution unit determines from the first part 35 and the second part 36 where the latest copy of the operand is in the pipeline 10. The bypass stage 22, shown in FIG. 1, then directs the execution unit to the functional port specified by the first part 35 of the pipeline stage specified in the second part 36.

The table 30 resides and functions in the back end 14 of the pipeline 10 in the particular embodiment of FIG. 1. More particularly, the table 30 resides in the operand locate stage 21 and instructs the bypass stage 22 where to find needed operands in the pipeline 10. The execution units can then access the table 30 in the operand locate stage 21 to find out whether a needed operand is speculative or committed and access the correct operand. This is particularly useful in correcting execution problems in the pipeline 10 in certain embodiments as set forth below.

As mentioned earlier, retiring instructions includes checking for problems in execution. Problem checking is performed by the retirement stage 24 and may use any suitable technique known to the art. As will be appreciated by those in the art, some amount of problem checking is implementation specific, and so problem checking may also be implementation specific in some respects.

The precise manner in which problems are checked is not material to the present invention. In one embodiment, if a problem is detected, the uncommitted execution results are squashed, or ignored. The pipeline 10 is then flushed or drained. i.e., the pipeline 10 is either reset or all instructions in the back end 14 are allowed to complete execution and the speculative registers are reset. The pipeline 10 is then replayed. The pipeline 10 in variations on this embodiment may replay only the back end 14 or the entire pipeline 10. The replay may be partial or complete.

Many types of problems may be detected. Exemplary problems include:

(1) a cache miss;

(2) a branch or predicate misprediction;

(3) an exception, such as a page fault or an illegal instruction;

(4) a translation look-aside buffer ("TLB") miss; and (5) certain data dependencies, such as loadstore conflicts.

In one particular embodiment, back end replay is, as a general rule, instituted as a result of memory access problems. However, the invention is not so limited. Also, some problems may not result in back end replay. These problems may be handled in other ways in some embodiments. Finally, some problems may be classed as exceptional conditions not requiring any repair at all. These variations are all implementation specific.

Figure 4:
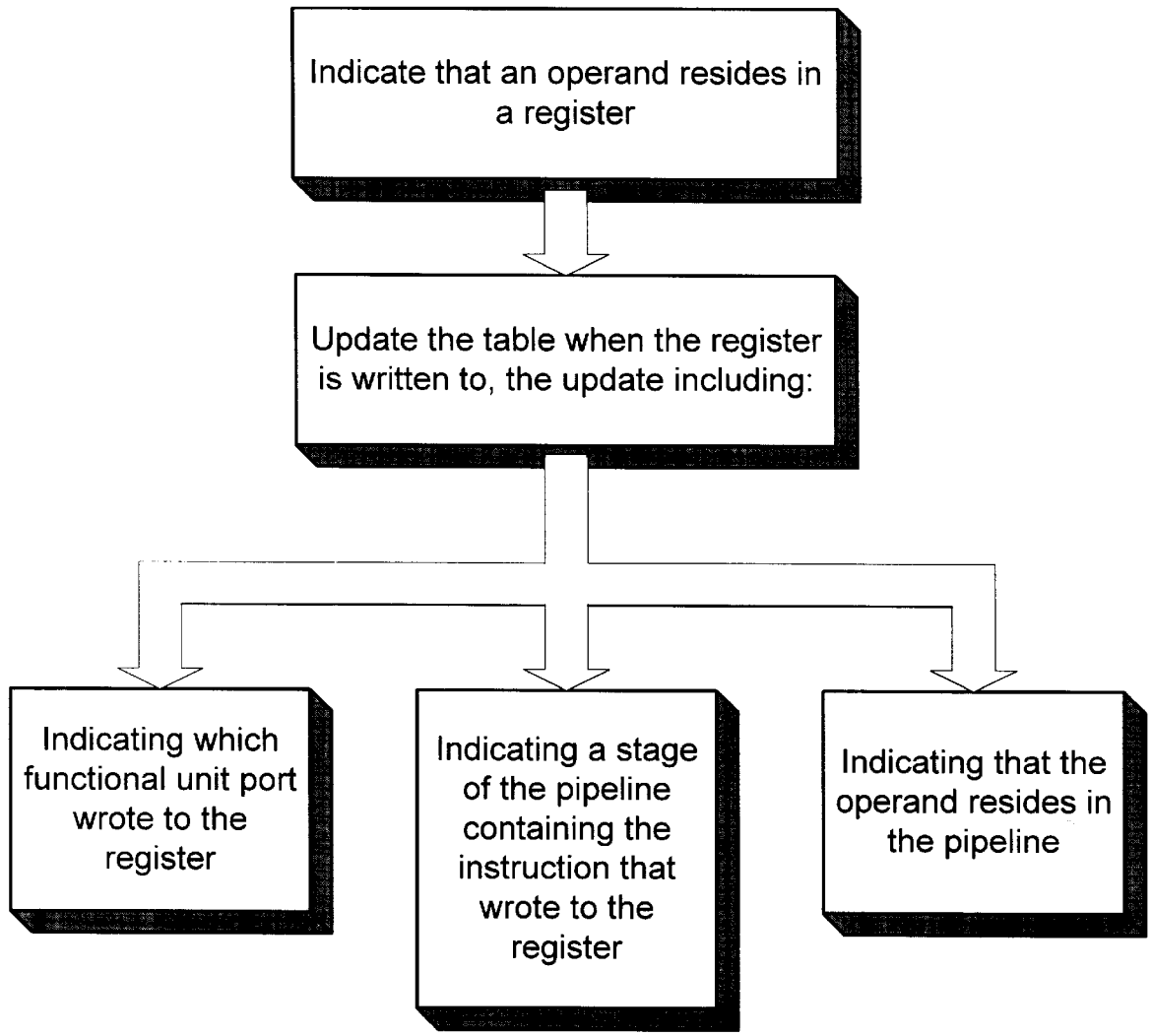
FIG. 4 illustrates a method for tracking operands in a processor pipeline using a table such as that depicted in FIG. 2.

FIG. 4 illustrates one particular embodiment of a method for tracking operands in a processor pipeline such as the pipeline 10 of FIG. 1. The method generally comprises indicating that the operand resides in a register and updating a corresponding entry in a table when the register is written to. Updating the table, in turn, includes: (1) indicating which functional unit port wrote to the register; (2) indicating a stage of the pipeline containing the instruction that wrote to the register; and (3) indicating that the operand resides in the pipeline.

The method of FIG. 4 may be employed in several variations. For instance, if a table such as the one in FIG. 2 is used, then the indication that the operand resides in a register and the indication that the operand resides in the pipeline may be made using the same entry in the table. Assuming a table such as the table 30 in FIG. 2 is used, the third part 37 of table entry 32 may originally be set to indicate the register before the first instruction is processed or by a replay, whether full or partial and whether back end or full, or stall of the pipeline 10. The indication could then be updated when the register is first written to and reset at the next replay or stall. Alternatively, the third part 37 may be updated each time the corresponding register is written to.

The method illustrated in FIG. 4 might also be employed as part of a larger method for locating operands. For instance, in some embodiments, the method of FIG. 4 might further comprise reading the operand from the indicated port of the indicated stage until there is an indication that the operand once again resides in the register. This may include steering a bypass network to the indicated port of the indicated stage. One such embodiment is discussed further below relative to FIGS. 5–8.

Figure 5:
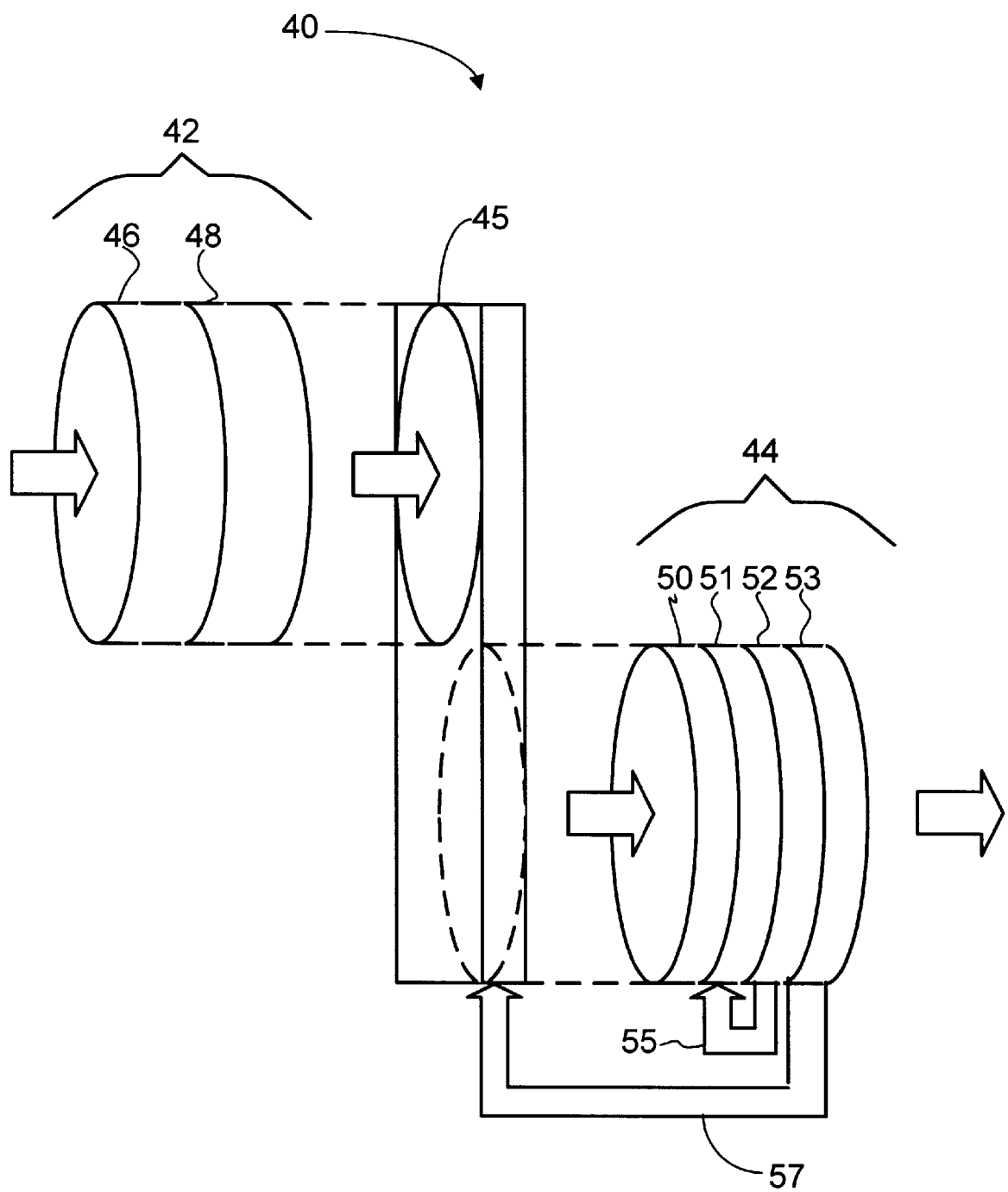
FIG. 5 conceptually illustrates one particular embodiment of the pipeline of FIG. 1.

FIG. 5 illustrates in a partially exploded view one particular embodiment 40 of the pipeline 10 in FIG. 1 capable of back end replay. The pipeline 40 includes a queue 45 capable of storing an intermediate state of the processor (not shown) from which the back end 44 may be replayed per a request transmitted over a channel 57 as set forth below. The queue 45 is functionally positioned between the front end 42 and the back end 44. The front end 42 enters instructions into the queue 45 from the scheduling stage 49. More precisely, in the embodiment of FIG. 5, the front end 42 enters micro-ops generated from the instructions into the queue 45. The queued micro-ops define an intermediate state of the machine from which the back end 44 of the pipeline 40 can be replayed as discussed more fully below.

The front end 42 and the back end 44 may have the same construction as the front end 12 and the back end 14 in the pipeline 10 of FIG. 1. Thus, the front end 42 includes a fetch stage 46 and a decode stage 48. The back end 44 includes, among others, an operand locate stage 50, a bypass stage 51, an execution stage 52, and a retirement stage 53. However, as with the pipeline 10, the precise construction of the front end 42 and the back end 44 in terms of stages is not material to the practice of the invention. The stages listed are neither exclusive nor exhaustive and other embodiments may vary depending on the particular implementation.

Progress through the pipeline 40 is controlled by flip-flops (not shown) and/or staged domino circuits (also not shown). In the embodiment of FIG. 5, the flip-flops and/or staged domino circuits are free running and the pipeline 40 does not stall. Instead of stalling when a problem is detected, the pipeline 40 is either flushed or drained and a replay is instituted.

In one particular embodiment, the pipeline 40 includes N arithmetic logic units ("ALUs") executing instructions in parallel and the queue 60 for that particular embodiment is N columns wide. This particular embodiment is also superscalar, and so it is sufficiently wide to provide micro-ops to the N ALUs at every clock cycle. The queue 45 is also sufficiently long that it can store the micro-ops generated for each unretired instruction in the back end 44. The micro-ops should not be deallocated from the queue 45 until the instructions from which they are generated are retired. Thus, the queue 45 stores the intermediate state of the pipeline 40. The state is "intermediate" in that it represents the instructions in a state subsequent to their initial state, i.e., unexecuted, and prior to their final state, i.e., retired.

The queue 45 in this particular embodiment includes a head pointer (not shown) to the "head" of the queue 45 where new micro-ops are entered into the queue 45, a tail pointer (not shown) to the next row of micro-ops to enter the back end 44 of the pipeline 40 for execution, and a replay pointer (not shown) to the oldest, unretired micro-op in the queue 45. To initiate a back end replay, the pipeline 40 copies the replay pointer into the tail pointer. These aspects of the queue 45 may be implemented using traditional queue construction techniques. Further, alternative embodiments for the queue 45 might also be employed.

The back end 44 contains a set of speculative registers (not shown in FIG. 5) and a set of architectural registers (also not shown in FIG. 5) also as are common in superscalar processor pipelines. In the particular embodiment of FIG. 5, they might reside in the execution stage 53 and the retirement stage 54, respectively. The speculative registers and the architectural registers are accessed through what are known as the "speculative register file" and the "architectural register file" (not shown in FIG. 5).

The use of register files in this manner is commonly known in the art. The register files include read and write ports through which the execution units read from and write to the registers in the register file. Operands stored in the speculative registers are uncommitted. Operands in the architectural registers are committed. The retirement stage 54 performs a number of problem checking tasks and retires operands from the speculative registers to the architectural registers to finalize execution results and commit the executed instructions to the architectural state of the processor.

The micro-ops generated from the instructions are entered into the queue 45 as described above and enter the back end 44 from the queue 45. The back end 44 processes the micro-ops and makes predictions to resolve data and control dependencies when necessary. The micro-ops are processed on the assumption that all predictions correctly resolve the underlying dependencies. Once the queued micro-ops are executed, they are temporarily stored in the speculative registers to await commitment to an architectural state.

Committing the instructions to the architectural state includes checking for problems in execution. Many types of problems may be detected. Exemplary problems include a cache data miss, a mispredicted predicate, and way misprediction. In one particular embodiment, back end replay is, as a general rule, instituted as a result of memory access problems. However, the invention is not so limited. Also, some problems may not result in back end replay. These problems may be handled in other ways in some embodiments. Finally, some problems may be classed as exceptional conditions not requiring any repair at all. These variations are all implementation specific.

The pipeline 40 requests a replay over the channel 57. In one embodiment, the replay is in the back end 44 and is a partial replay. A mask (not shown) including a series of 1s and 0s indicates which instructions being checked resulted from incorrectly predicted control or data dependencies and need to be replayed. In the embodiment in which the queue 45 is N ALUs wide, the mask includes N 1s and 0s, one for each ALU. The mask is an index, or key, back into the queue 15 identifying the point in the execution stream where the problem occurred. The retirement logic (not shown) transmits the mask and the replay request to the queue 45. The tail pointer of the queue 45 is then repositioned as discussed above and the replay commences according to the mask, which is merged by the queue 45 with the queued micro-ops.

Once a problem is detected, the problem and its effects must be repaired. Again, the repair will be implementation specific depending on, among other things, the nature of the problem. For instance, if the problem is:

(a) a predicate misprediction, the correct predicate must be inserted for the replay; or (b) a load store conflict, the store must be completed, the cache updated, and then the correct value loaded.

Problem repair can be quickly performed because the queue 45 has stored the intermediate state of the pipeline 40. Thus, the problem can be identified and corrected in the queue 45 and the execution stream replayed. The effects of the problem will then necessarily be corrected in the replay.

The results of the re-execution are temporarily buffered in the speculative registers and checked for problems. Although the problem necessitating the replay should not reoccur, other problems might arise. If a new problem is detected, then a replay is once again requested as set forth above. The pipeline 40 will eventually produce a problem-free set of uncommitted results that can then be retired. Since the original problem should not re-occur, each iteration of the back end 44 progresses toward retirement of the instructions from which the micro-ops were generated. Techniques for resolving control and data dependencies are sophisticated and sufficiently accurate replay is the exception rather than the rule.

Figure 6:
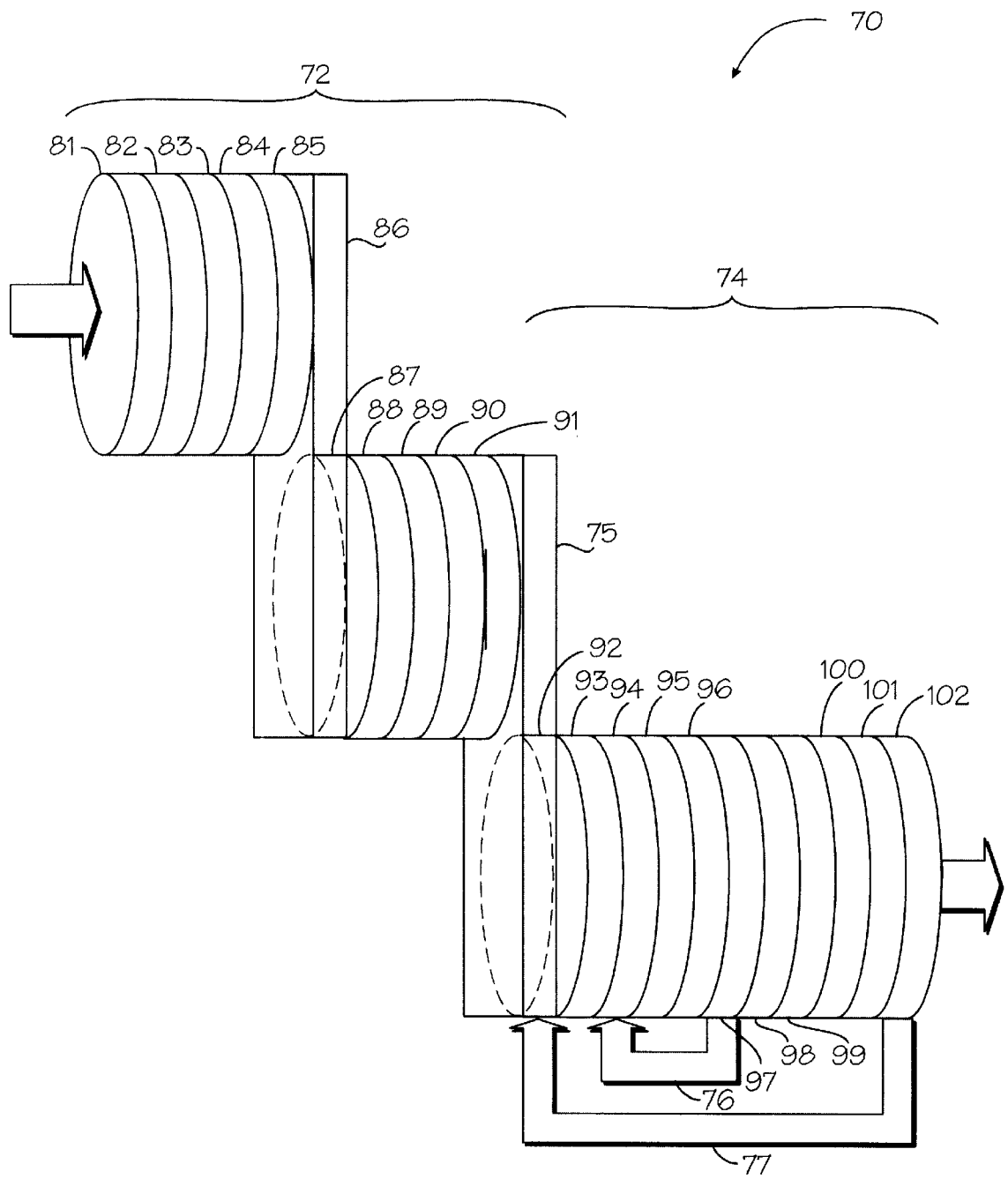
FIG. 6 depicts part of one particular back end for the pipeline illustrated in FIG. 5.

FIG. 6 more particularly illustrates one particular embodiment 74 of the back end 44 of FIG. 5. The particular embodiment 74 includes:

(a) stages 94–95 used to read a table 104, a speculative register file 106, and an architectural register file 108 containing the speculative and architectural registers, respectively;

(b) stages 96–97 containing the bypass network 105;

(b) stages 97–99 containing the ALUs 110;

(c) a stage 100 where the speculative register file 106 is written to;

(d) stages 100–101 containing the retirement logic 112 that perform checks required for retirement; and (e) a stage 102 where the architectural register file 108 is written to, meaning the temporary execution results have been committed to the architectural state.

However, the functional distribution across the various stages is not material to the practice of the invention.

Still referring to FIG. 6, the table 104 may, in some embodiments, be the table 30 of FIG. 2. However, in the particular embodiment of FIG. 6, the table 104 indicates not only whether the operand resides in a register, but whether it resides in a speculative register or an architectural register. The bypass network 105 is a 63-1 multiplexer steered by the table 104. If an ALU 110 needs an operand, the pipeline control 120 notifies the table 104 and the ALU 110 is directed by the table 104 through the bypass network to the correct location of the operand. The table 104 indicates whether the operand is in the back end 74 of the pipeline 70, the speculative registers of the speculative register file 106, or in the architectural registers of the architectural register file 108. If the table 104 indicates the operand has been retired, it can be copied from the architectural register file 108 through the channel 116. If the operand is in the speculative register file 106, it can be copied from there over the channel 122. If the operand is in the pipeline 70, the table 104 steers the bypass network 105 so that the ALU 110 reads the operand from the last functional unit port of the pipeline stage indicated in the table 104 over the channel 126. The operands are read through bypass network 105 over the channel 124. Thus, the ALU 110 reads the most current copy of the operand as discussed above.

Figure 7:
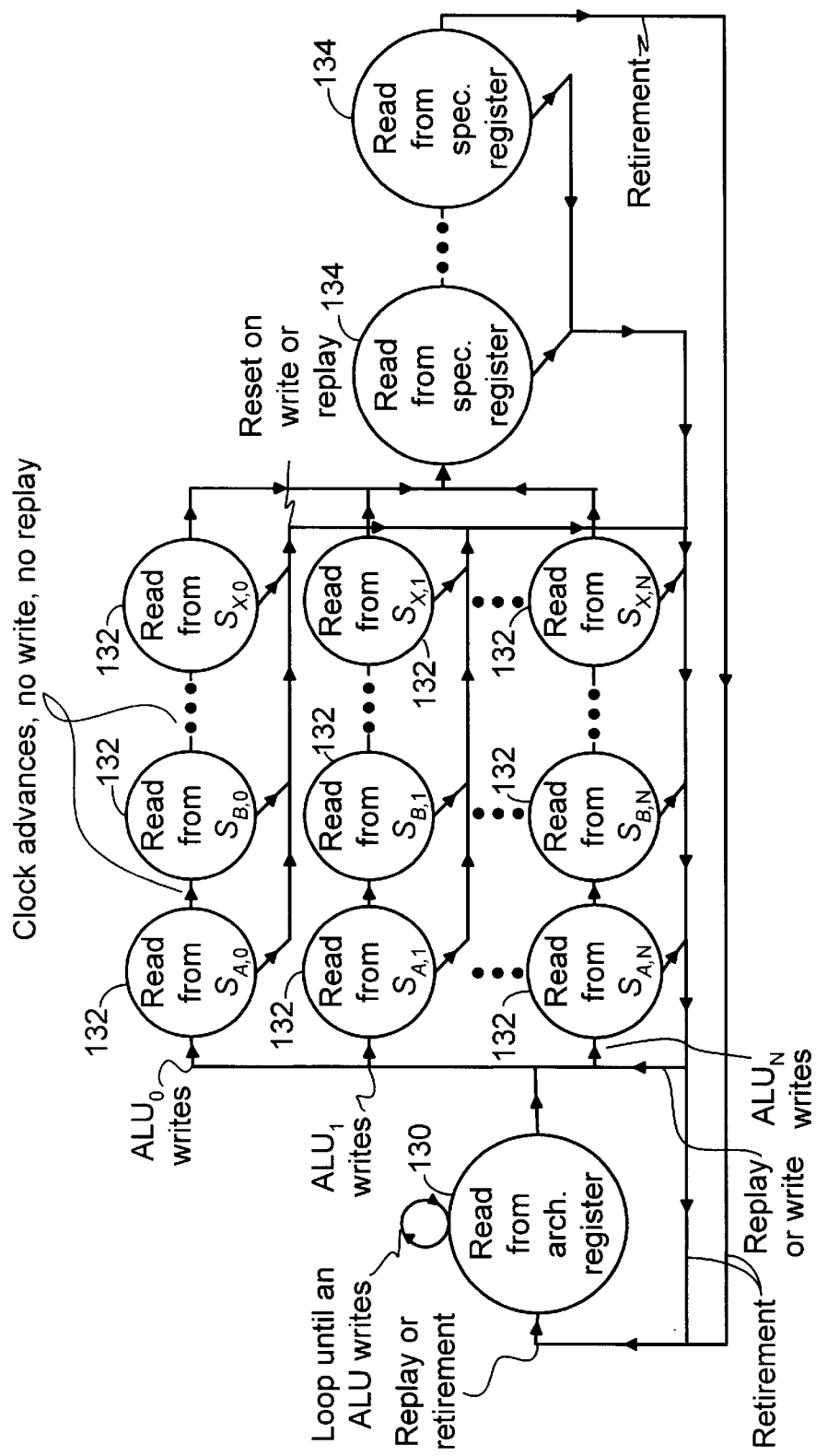
FIG. 7 illustrates a state machine for the particular table shown in FIG. 6.

FIG. 7 presents a state diagram for the table 104 in the embodiment of FIG. 6. The operation of table 104 is similar to the operation of the table 20 of FIG. 2. The state machines of FIGS. 3 and 7 reflect this similarity with only a few differences. First, the state 130 reflects that operands are first read from the architectural registers of the architectural register file 108. Second, once the operands advance from the last state $S_x$ represented by the states 132, they are stored in the speculative registers of the speculative register file 106. The operands are then read from the speculative register file 106 as represented by the states 134. The particular embodiment of FIG. 6 either retires the operands or requests a replay within a predetermined number of clock cycles. The table 104 advances through one state 134 for each of these predetermined number of clock cycles.

The operand is eventually stored in the speculative register file 106 until the retirement unit 112 completes the problem checking. If there are no problems, then the retirement unit 112 retires the operand to the architectural register file 108. If a problem is detected, the retirement unit 112 requests a back end replay through the channel 118 as discussed above.

Figure 8:
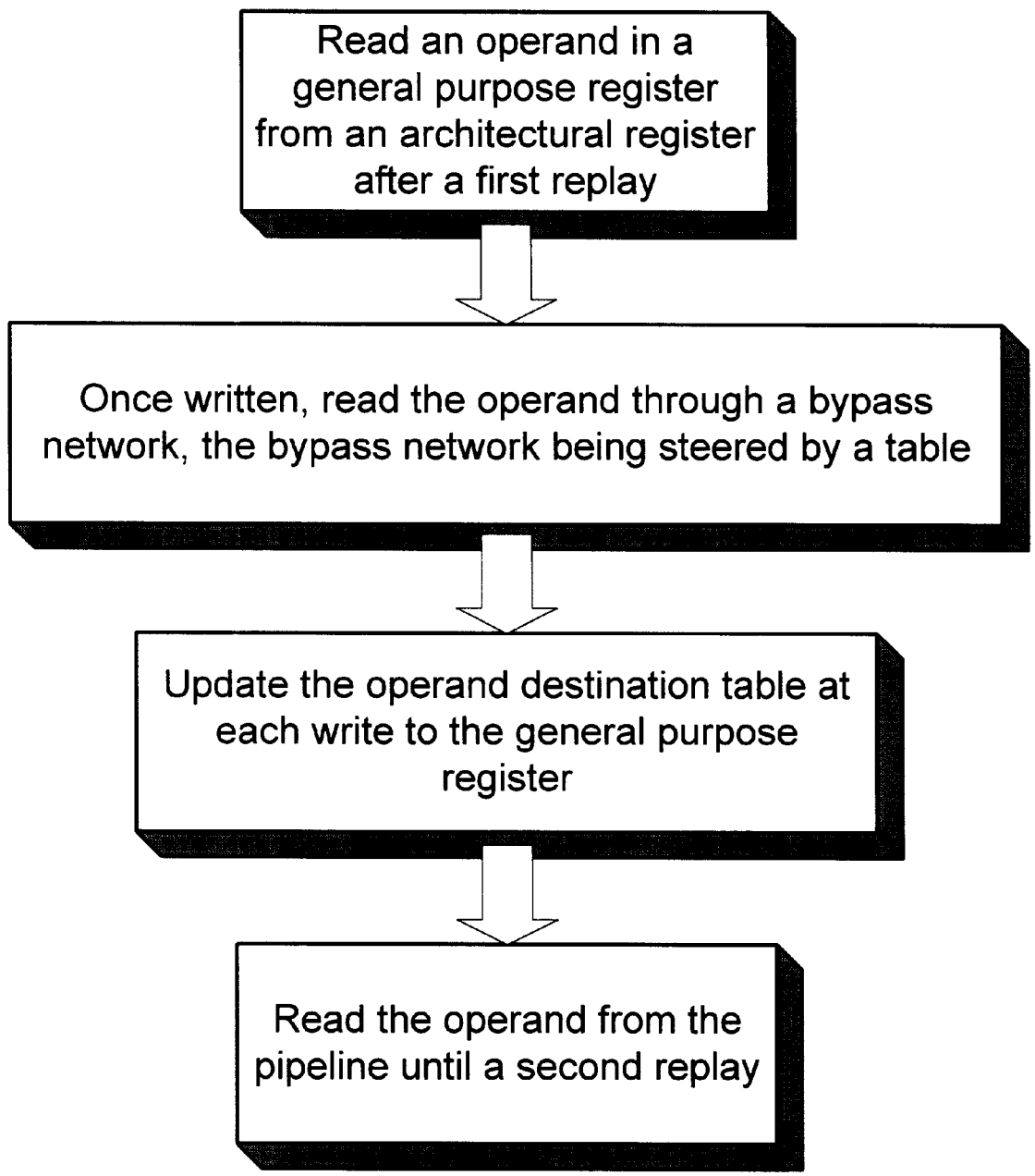
FIG. 8 illustrates a method for tracking operands in a pipeline such as that in FIGS. 5–6 using a table such as the one in FIG. 2.

FIG. 8 depicts one method for locating operands in the pipeline 70 of FIG. 6 after a back end replay using the table 30 of FIG. 2 to implement the table 104. The execution unit reads the operand from the architectural register file as indicated by the table 104 after a first replay. Once, written, subsequent instructions read the operand through the bypass network 105 as the value travels down the pipeline 70. The bypass network 105 is steered by the table 104 for this purpose. The table is updated at each write to the general purpose register to indication the location of the latest copy of the operand in the pipeline 70. Finally, the operand is read from the pipeline 70 until the next replay resets the table 104 to once again point to the architectural register file 108.

The present invention in its various embodiments tracks the location of operands in a processor superscalar pipeline more efficiently that does the state of the art for wide and deep pipelines. The table replaces the typical comparator network, occupies a lesser proportion of the processor die, and may be somewhat faster than the comparator network for particularly wide and deep pipelines. Also, the table in the embodiment of FIG. 2 is structured like a register file, thereby facilitating certain of its functions. Furthermore, the operation destination table does not increase in size with the width of the pipeline and only minimally with the depth relative to a comparator network.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:

during instruction execution, locating an operand needed by an execution unit by accessing a table, the table tracking operands in a processor pipeline, the table comprising an entry for each of a plurality of general purpose registers, each entry including:

an indication of a functional unit port that last wrote to the corresponding general purpose register;

an indication of a pipeline stage of the processor pipeline containing an instruction that last wrote to the corresponding general purpose register; and an indication of whether the operand resides in the processor pipeline or an architectural register.

2. The method of claim 1, wherein at least one entry in the table is implemented with a state machine.

3. The method of claim 1, wherein the processor pipeline comprises:
   a front end preparing instructions for execution; and
   a back end executing instructions prepared by the front end.

4. The method of claim 3, wherein the table resides in the back end of the processor pipeline.

5. The method of claim 1, wherein the table steers a bypass network when the operand resides in the processor pipeline.

6. The method of claim 1, wherein the indication of whether the operand resides in the processor pipeline or the architectural register is set to indicate the architectural register after a replay.

7. A method for tracking operands in a processor pipeline, the method comprising:
   indicating in a table entry that identifies the location of the latest copy of an operand associated with a register that the operand resides in an architectural register;
   updating the table when the register is written to, the update including:
      indicating which port wrote to the register;
      indicating a stage of the processor pipeline containing an instruction that wrote to the register; and
      indicating that the operand resides in the processor pipeline.

8. The method of claim 7, further comprising reading the operand from the indicated port of the indicated stage until there is an indication that the operand once again resides in the architectural register.

9. The method of claim 7, wherein reading the operand from the indicated port of the indicated stage includes steering a bypass network to the indicated port of the indicated stage.

10. The method of claim 9, wherein the indication that the operand once again resides in the architectural register is set by a replay.

11. The method of claim 10, wherein the replay is a back end replay.

12. The method of claim 7, wherein the indication that the operand resides in an architectural register is set by a replay.

13. The method of claim 7, wherein the table is implemented by an array of state machines.

14. The method of claim 13, wherein the state machines are self-updating.

15. The method of claim 7, further comprising updating the table when the register is written to a second time, the second update including:
   indicating which port wrote to the register; and
   indicating a stage of the pipeline containing the instruction that wrote to the register.

16. A method for tracking operands in a processor pipeline, the method comprising:
   reading an operand in a general purpose register from an architectural register as indicated by a table after a first replay;
   once the general purpose register is written to, reading the operand through a bypass network, the bypass network being steered by the table;
   updating the table to indicate the location of the latest copy of the operand in the processor pipeline at each write to the general purpose register; and
   reading the operand from the processor pipeline through the bypass network as indicated by the table until a second replay.

17. The method of claim 16, wherein the second replay resets the table to indicate that the operand resides in the architectural register.

18. The method of claim 16, wherein the table indicates the location of the latest copy of the operand by storing the identity of the last port writing to the general purpose register and the stage of the processor pipeline containing the instruction that last wrote to the general purpose register.

19. A pipeline for a superscalar processor, the pipeline comprising:
   a front end preparing a plurality of instructions for execution;
   a back end executing the plurality of instructions prepared by the front end, the back end including:
      a table indicating:
         whether an operand resides in the pipeline or a register; and
         which port of which pipeline stage last wrote to the general purpose register with which the operand is associated;
      a bypass network steered by the table; and
      an execution unit that accesses the table to read operands through the bypass network or from the architectural register as indicated by the table.

20. The pipeline of claim 19, wherein the table comprises an entry for each one of a plurality of general purpose registers, each entry including:
   a register identifier;
   an indication of which port last wrote to the corresponding register;
   an indication of a pipeline stage containing the instruction that last wrote to the corresponding register; and
   an indication of whether the operand resides in the pipeline or an architectural register.

21. The pipeline of claim 20, wherein at least one entry in the table is implemented with a state machine.

22. The pipeline of claim 20, wherein the indication of whether the operand resides in the pipeline or the architectural register is set to indicate the architectural register after a replay.

23. The pipeline of claim 19, wherein the front end includes:
   an instruction fetch stage; and
   a decode stage decoding instructions fetched by the fetch stage into micro-ops.

24. The pipeline of claim 19, wherein the back end further includes:
   a micro-op queue into which micro-ops generated from instructions by the front end are entered by the front end; and
   a retirement stage checking problems before committing results stored in a plurality of speculative registers to an architectural state.

25. The pipeline of claim 24, wherein the retirement stage requests a replay upon detecting a problem.

26. A method for tracking an operand in a general purpose register through a pipeline of a superscalar processor, the method comprising:
   maintaining an indication of whether the value is in the pipeline or in an architectural register;
   indicating which functional unit port last wrote to the general purpose register; and indicating in which stage of the pipeline the last instruction that wrote to the general purpose register was when the instruction wrote to the general purpose register.

27. The method of 26, further comprising steering a bypass network to obtain a copy of the operand from the indicated functional unit port of the indicated stage when the operand is in the pipeline.

28. The method of 26, wherein the maintaining includes setting the indication of whether the operand resides in the pipeline or in the architectural register to indicate the architectural register after a replay.

29. A method for tracking operands in a pipeline of a processor, the method comprising:

reading an operand specifying a register as indicated by a table after a first replay;

once the register is written to, reading the operand through a bypass network, the bypass network being steered by the table;

updating the table to indicate the location of the latest copy of the operand in the pipeline at each write to the general purpose register; and reading the operand from the pipeline as indicated by the table until a second replay.

30. The method of claim 29, wherein the second replay resets the table to indicate that the operand resides in an architectural register.

31. The method of claim 29, wherein the table indicates the location of the latest copy of the operand by storing the identity of the last port writing to the general purpose register and the stage of the pipeline containing the instruction that last wrote to the general purpose register.

32. A method of tracking operands comprising:

initializing an entry of a table corresponding to a register with which an operand is associated to indicate that the operand should be read from an architectural register file;

after the operand has been written by an execution unit, updating the entry to control bypassing of the operand by recording a functional unit port of the execution unit and a pipeline stage from which the write originated;

as long as there are no further writes to the operand and no replay involving the operand is instituted, updating the entry each clock cycle to reflect progression of the operand from a current pipeline stage to a subsequent pipeline stage; and if a replay involving the operand is instituted, then reinitializing the entry to indicate that the operand should again be read from the architectural register file.

33. A machine-readable medium having stored thereon data representing sequences of instructions, the sequences of instructions which, when executed by a processor, cause the processor to perform the steps of:

during instruction execution, locating an operand needed by an execution unit of the processor by accessing a table, the table tracking operands in a pipeline of the processor, the table comprising an entry for each of a plurality of general purpose registers, each entry including:

an indication of a functional unit port that last wrote to the corresponding general purpose register;

an indication of a pipeline stage of the pipeline containing an instruction that last wrote to the corresponding general purpose register; and an indication of whether the operand resides in the pipeline or an architectural register.

* * * * *